(No Model.)

H. COMMANDOER.
SLED.

No. 355,300. Patented Jan. 4, 1887.

Witnesses
M. E. Fowler
J. W. Gardiner

Inventor
Herman Commandoer
By his Attorneys

UNITED STATES PATENT OFFICE.

HERMAN COMMANDOER, OF TOMAH, WISCONSIN.

SLED.

SPECIFICATION forming part of Letters Patent No. 355,300, dated January 4, 1887.

Application filed August 18, 1886. Serial No. 211,217. (No model.)

*To all whom it may concern:*

Be it known that I, HERMAN COMMANDOER, a citizen of the United States, residing at Tomah, in the county of Monroe and State of Wisconsin, have invented a new and useful Improvement in Sleds, of which the following is a specification.

My invention relates to an improvement in sleds; and it consists in the peculiar construction and combination of devices, that will be more fully hereinafter set forth, and particularly pointed out in the claims.

The object of my invention is to provide a sled which is adapted to be drawn over an ordinary road with little friction when there is no snow; and this object I attain by the construction hereinafter described, and illustrated in the accompanying drawings, in which—

Figure 1:
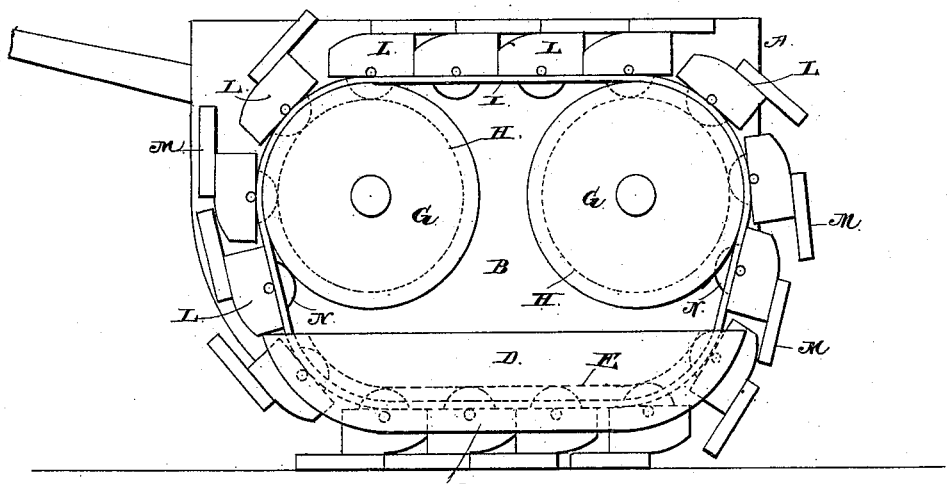
Figure 2:
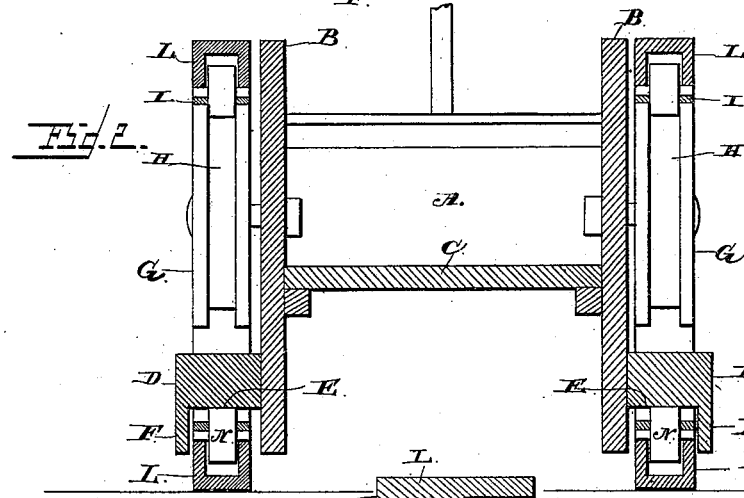
Figure 3:
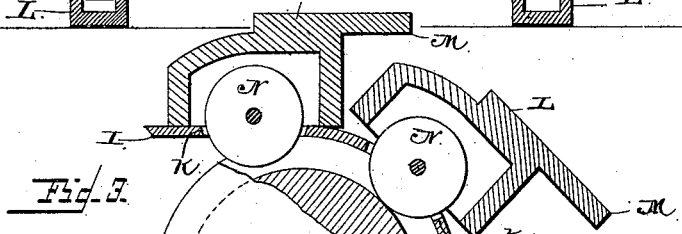

Figure 1 is a side elevation of a sled embodying my improvements. Fig. 2 is a vertical transverse sectional view of the same. Fig. 3 is a detail view.

A represents the body of the sled, having vertical sides B and the top or platform C. On the outer sides of the vertical sides B, and at the lower edges thereof, are runners D, which are provided with grooves E. The flanges F of the runners on opposite sides of the grooves extend downwardly therefrom. Above the runners, on the sides of the sled, are journaled wheels G, which are provided with peripheral grooves H.

I represents endless flexible belts, which pass over the wheels G and extend through the grooves E of the runners on each side of the sled. The said endless belts are each provided with transverse openings K, and on the outer sides of the flexible belts, and registering with the said openings, are blocks L, which have their front lower sides rounded, and are provided with tread-plates or feet M. The said tread-plate or foot of each block extends rearwardly therefrom over the curved portion of the front end of the block in rear thereof. The said blocks L are hollow, and in them are journaled anti-friction rollers N, which extend through the openings K of the belts and enter the grooves H of the wheels G and the grooves E of the runners. The tread-plates of the blocks in the grooves of the runners bear upon the ground, and when the sled is drawn forward the endless belts rotate on the wheels G and through the grooves in the runners, thereby forming traction-belts, which permit the sled to be very readily drawn with very little friction. The usual pole or shafts are attached to the sled, as shown.

Having thus described my invention, I claim—

1. The combination of the sled having the grooved runners and the grooved wheels G with the flexible endless belt extending over the said wheels and under the grooves of the runners, and provided with the tread plates or blocks, substantially as described.

2. The combination of the sled having the grooved wheels G and the grooved runners with the flexible endless belts extending over the said wheels and under the grooves in the runners, the said belts being provided with the anti-friction rollers in their inner sides to work in the grooved wheels and runners, and with the tread-blocks on their outer sides to bear against the ground as the sled progresses, substantially as described.

3. The traction-belt having the hollow blocks provided with the rearwardly-extending tread-plates or feet, and the anti-friction rollers journaled in the said blocks and projecting from the inner sides of the belt, substantially as described.

In testimony that I claim the foregoing as my own I have hereto affixed my signature in presence of two witnesses.

HERMAN COMMANDOER.

Witnesses:
JOHN CRAPP,
H. W. TYLER.